Figure 1:
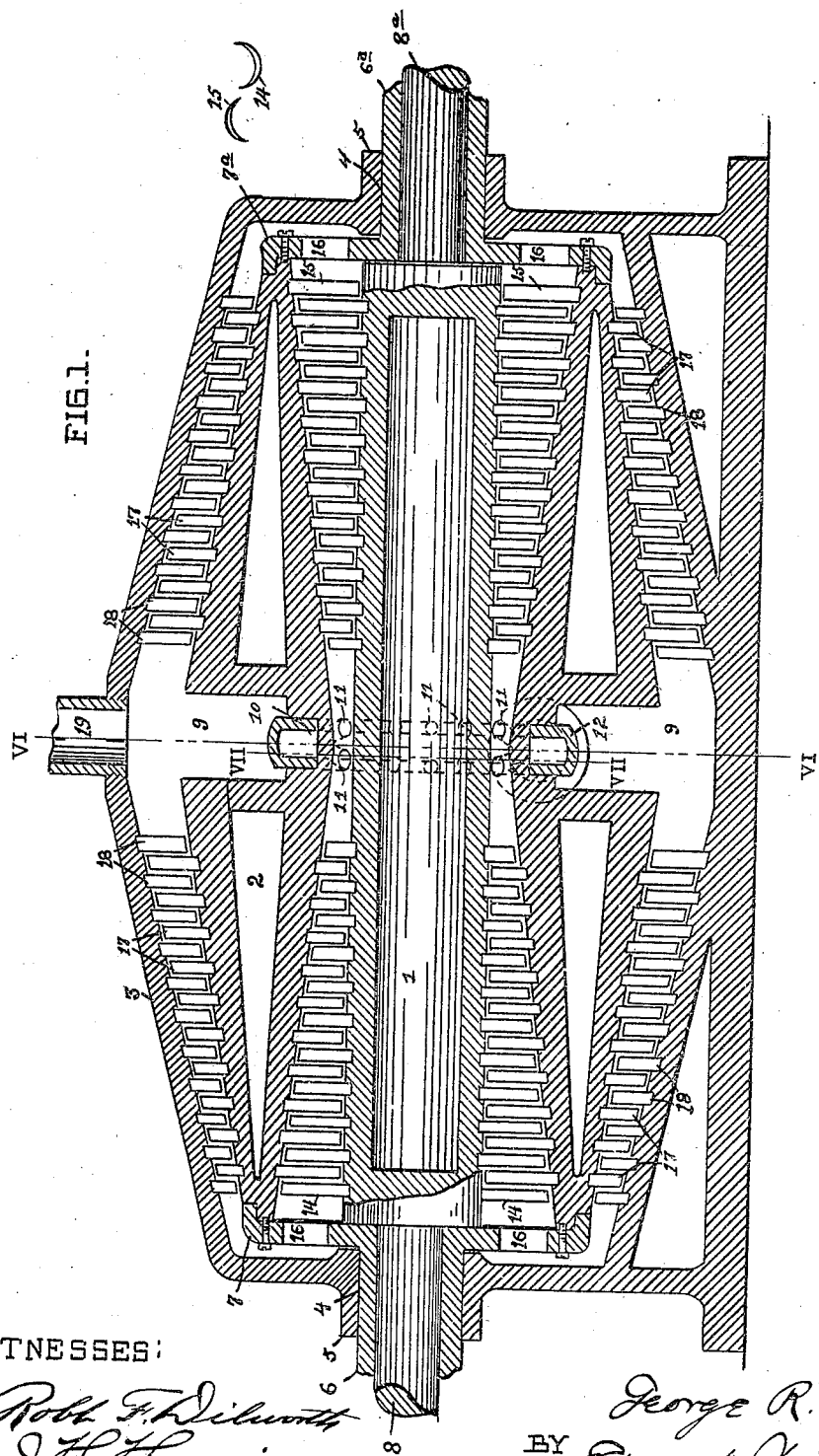

G. R. RIGGS.
ROTARY MOTOR.
APPLICATION FILED OCT. 17, 1907.

961,017.

Patented June 7, 1910.
4 SHEETS—SHEET 1.

WITNESSES:

INVENTOR.
George R. Riggs
BY
HIS ATTORNEY

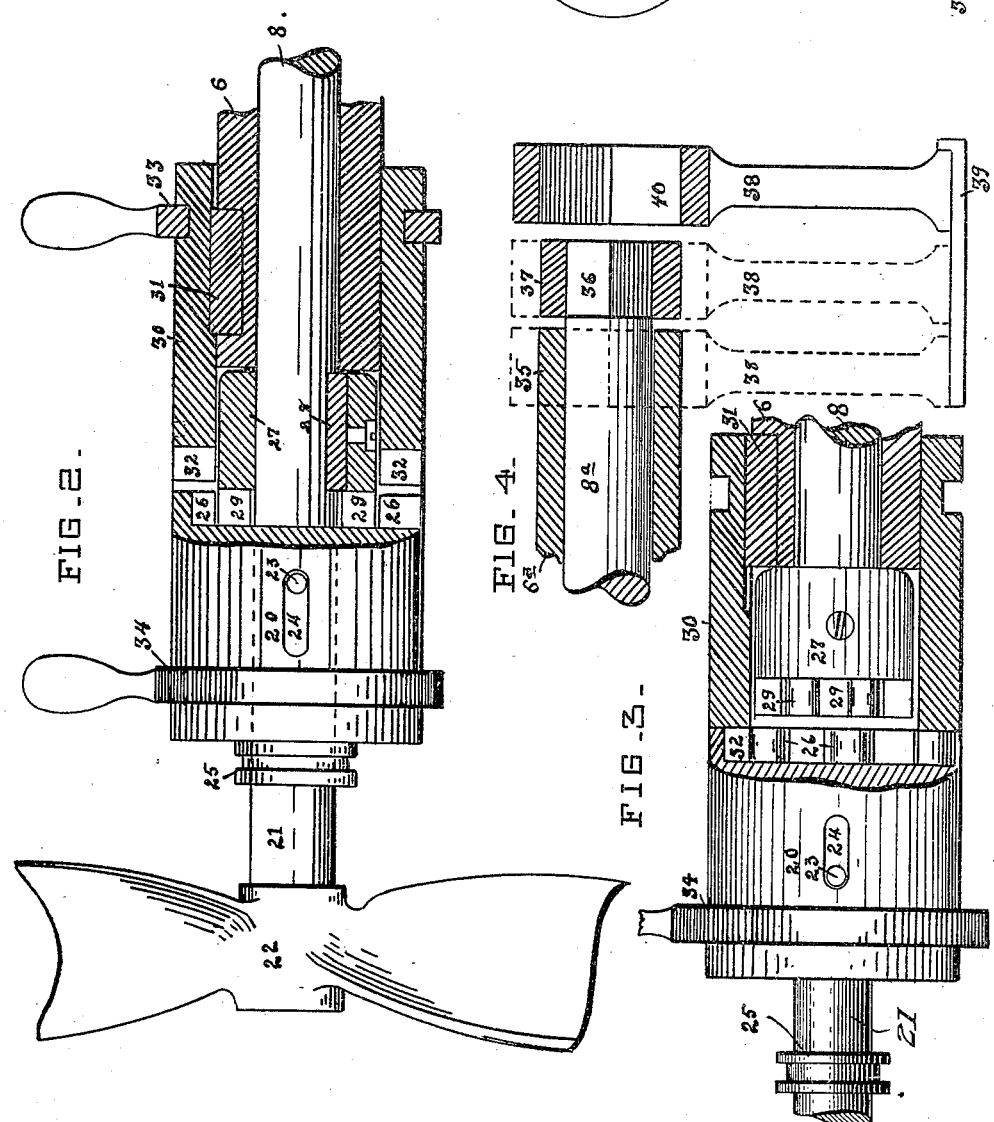

G. R. RIGGS.
ROTARY MOTOR.
APPLICATION FILED OCT. 17, 1907.

961,017.

Patented June 7, 1910.
4 SHEETS—SHEET 3.

WITNESSES:
Robt. F. Dilworth
J. H. Harrison

INVENTOR
BY George R. Riggs
Edward A. Laurence
HIS ATTORNEY

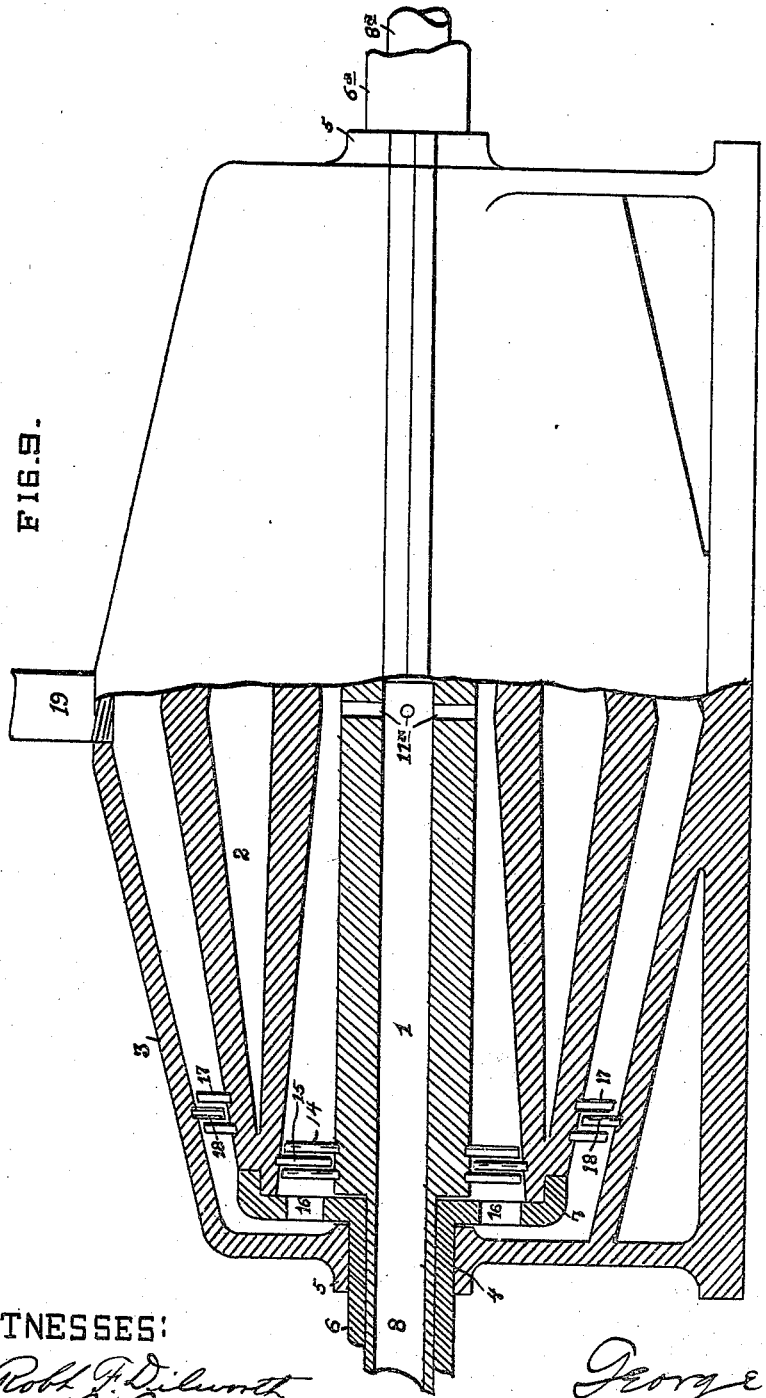

UNITED STATES PATENT OFFICE.

GEORGE R. RIGGS, OF ALLEGHENY, PENNSYLVANIA.

ROTARY MOTOR.

961,017. Specification of Letters Patent. Patented June 7, 1910.

Application filed October 17, 1907. Serial No. 397,782.

*To all whom it may concern:*

Be it known that I, GEORGE R. RIGGS, a citizen of the United States, residing in the city of Allegheny, in the county of Allegheny and State of Pennsylvania, have invented or discovered new and useful Improvements in Rotary Motors, of which the following is a specification.

My invention consists of certain new and useful improvements in turbines or rotary engines or motors. Such mechanisms of the general type illustrated now in use are non-reversible, so that to obtain rotary motion in both directions, two distinct engines or motors are provided, one capable of motion in one direction and the other in the reverse direction. This duplication of power mechanism results in greatly increasing the cost of installation and operation, in addition to occupying a relatively large space, which, as in the case of vessels, is a very important consideration.

My engine or motor is reversible, running equally well in either direction, thereby reducing the mechanism required by one half and effecting a like saving in original cost and operative expenses. I also show novel means for accomplishing these ends.

My mechanism is preferably composed of a central revoluble spindle or shaft provided with blades, preferably disposed in circumferential series of blades of similar pitch against which the power acts. Inclosing said spindle is a revoluble drum whose inner walls are also provided with similar series of blades of reverse pitch to those carried by the spindle and interposed alternately between the series of blades on the spindle. I prefer to inclose said drum in a steam or power tight casing into which the power medium is admitted and from which it is exhausted after use. I prefer to provide the outer surface of the drum with circumferential series of blades of a pitch adapted to rotate the drum in the same direction as do the internal blades thereof. The inner wall of said casing in such case is provided with similar series of blades of opposite pitch which are alternately interposed between the series of blades on the outside of the drum. In case no blades are provided on the outside of the drum, I omit the blades on the inside of the casing, and, if desired, the casing itself may be omitted and the power exhausted directly to the outer air or otherwise disposed of. I prefer to provide means for locking either the spindle or drum at will, thus forming of the same the fixed member of the mechanism while the remaining member is free to be rotated by application of power. Thus when it is desired to obtain rotary motion in the one direction, the drum is locked and the spindle permitted to rotate, while, when motion in the other direction is desired, the spindle is locked and the drum rotated in the other direction. I provide means for transmitting said motion from either drum or spindle or both.

If desired I may leave both drum and spindle unlocked and transmit motion from both. In case the drum is used as the rotary member, it is evident that by the provision of both internal and external blades, power is applied to said drum both internally and externally so that greater rotary force may be applied to the drum, when in service, than to the spindle, when the same is in service. This is an important feature as the drum may be used as the rotary member in ordinary use, as the forward travel of a vessel, while the spindle may be used for reverse motion when the same is desired, as in backing the vessel. I prefer to take advantage of the expansion of the power by enlarging both my internal and external blade chambers from the point of entrance of power to the point of exhaust of the same. I prefer to first admit the power to the interior of the drum and then pass the same, after use within the drum, to the exterior of the drum within the casing whence it may be exhausted. In the illustrated construction I have shown the drum arranged for the admission of power at the center thereof with increasing drum diameter from the center toward the ends. At the extremities of the drum I have placed ports for the admission of the power thence to the blade chamber formed between the exterior of the drum and the casing wall. This chamber is arranged to increase in capacity from the ends toward the center where exhaust means are provided for the final escape of the used power. I find this a convenient and satisfactory construction of parts.

I provide novel means for locking both drum and spindle at will, and also for throwing either drum or spindle into operative connection with the destination of power as occasion may arise.

Figure 7:
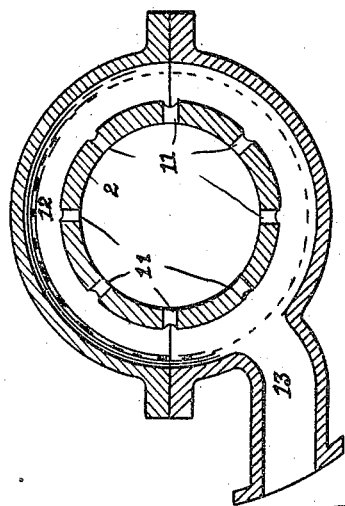
Figure 6:
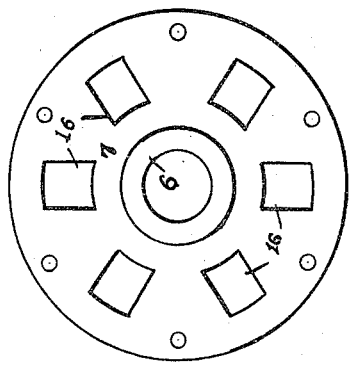
Figure 8:
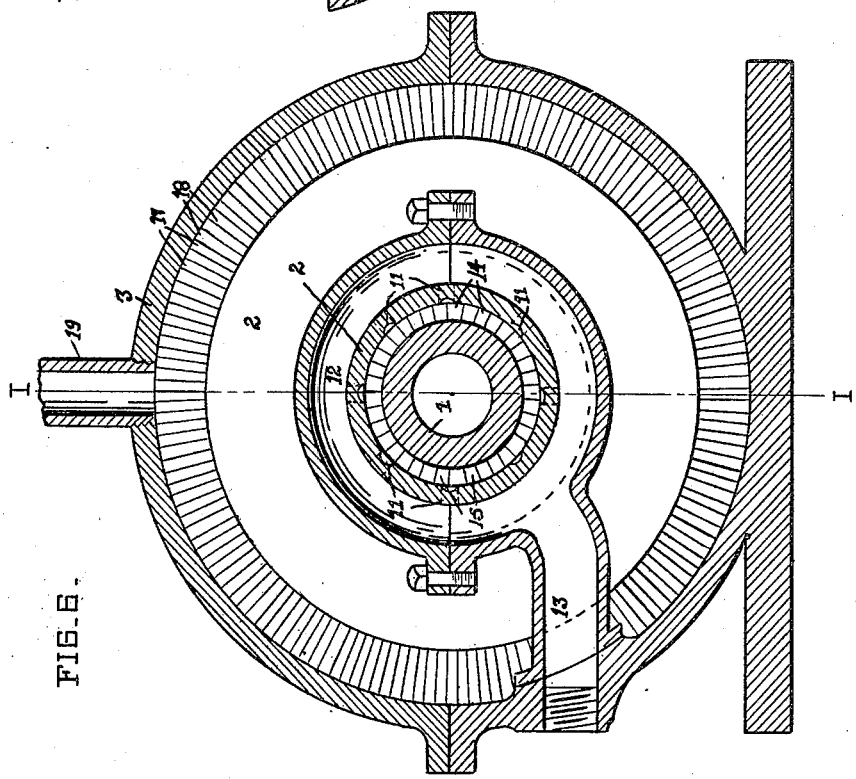

In the accompanying drawings, which are, however, merely illustrative of a practical embodiment of my invention and not intended to limit the scope thereof to the construction shown, Figure 1 is a central longitudinal section of the mechanism along the line I—I in Fig. 6, the extension shafts of the spindle being shown in full for the sake of clearness and the small details to the right of said figure showing the relative position of blades of adjacent series but opposing pitch; Fig. 2 is a continuation of the left extremity of Fig. 1 showing the clutch mechanism, partially in section, with the spindle thrown into operative connection with the propeller or other mechanism to be rotated; Fig. 3 is a similar view showing the drum in operative connection with the propeller shaft; Fig. 4 is a continuation of the opposite end of Fig. 1 showing means for locking either the drum or spindle at will, and Fig. 5 is an end view of the same; Fig. 6 is a transverse section along the line VI—VI in Fig. 1 and Fig. 7 is a similar view along the line VII—VII in Fig. 1; Fig. 8 is an elevation of an end plate of the drum, and Fig. 9 is a side elevation, partly in section, showing a modification of the construction shown in Fig. 1.

The following is a detail description of the above drawings:—

1 is the central spindle or shaft, preferably cylindrical, inclosed in a member or drum 2 which is power tight except as hereinafter set forth. I prefer to form said drum of annular cross section and increase the diameter thereof from the center toward the ends on the interior thereof while the outer diameter preferably increases from the ends toward the center.

3 is the outer casing which is preferably of increasing internal diameter from the ends toward the center in greater proportion, preferably, than the outer diameter of the drum 2. The ends of the casing 3 are provided with central annular openings 4—4 provided with exterior flanges 5—5 in which are journaled the sleeves 6—6ª integral with or rigidly attached to the end plates 7—7ª of the drum 2 to which drum they are removably attached by any convenient means as by the screws shown. Suitable packing or other means, not shown, is provided between the flanges 5—5 and the sleeves 6—6ª to prevent the escape of power from the casing. Rigidly attached to either end of the spindle 1 or made integral therewith are extension shafts 8—8ª which are journaled within the sleeves 6—6ª, suitable packing or other means being provided to prevent the escape of power between the same, said shafts protruding from the ends of said sleeves for purposes to be described later, as shown in Figs. 2, 3 and 4.

In the center of drum 2 is exterior annular recess 9 in the bottom of which is formed a second recess 10, preferably substantially rectangular in cross section, and from which recess 10 lead ports 11—11, preferably in pairs and extending through the wall of the drum 2 at an angle toward the ends thereof as shown in Fig. 1. Surrounding the drum 2 and seated in recess 10 is the annular, substantially U shaped member 12, forming a stationary power chamber whose bottom is formed by the outer wall of drum 2 and from which lead the ports 11—11 into the interior of the drum. Anti-friction means may be interposed between the drum and said member 12, if desired, to prevent friction when the drum is rotated. Power is admitted into the interior of the U shaped member 12 by means of a conduit 13 leading from the exterior of the casing 3 where a power line, not shown, may be attached.

14—14 are annular series of blades carried by spindle 1 and of any suitable design, such as that shown in the detail to the right of Fig. 1. Said series of blades are spaced apart a distance somewhat greater than their width to allow the alternate interposition therewith of similar series of blades, but of opposing pitch, 15—15, attached to the inner wall of the drum 2. The relative position and pitch of adjacent series of blades is illustrated in said detail figure. It is evident that if steam or other power be admitted to drum 2 through conduit 13, and ports 11—11, assuming the drum 2 to be locked stationary, the power would be exerted on the blades 14—14, from series to series of which it is thrown by the stationary blades 15—15 carried by the locked drum 2. It is thus evident that the spindle 2 would be rotated, in case the blades 14—14 are of the pitch illustrated in the detail figure, from right to left, while, in case the drum 2 is free and the spindle 1 is locked, the admission of power to the interior of drum would rotate the same from left to right, owing to the pitch of the blades 15—15.

16—16 are ports in the end plates 7—7ª through which the power escapes after traversing the drum 2 from the center to the ends thereof, acting in its travel upon the blades as described. It is thus evident that my mechanism may be rotated in either direction according as either the spindle or drum is locked. I may also provide similar blades, 17—17, in annular series, attached to the exterior of the drum 2 and of proper pitch to exert rotary force on said drum in the same direction as do the blades 15—15. Such annular series of blades 17—17 are spaced apart as is the case with blades 15—15 to permit of the alternate interposition of annular series of blades 18—18 attached to the inner wall of casing 3, said blades 18—18 being of opposing pitch to blades 17—17. The power passing out of drum 2 through ports 16—16 enters the blade chamber surrounding drum 2 and containing blades 17—17 and 18—18, and in case the drum 2 is unlocked exerts a rotary force to said drum by means of the blades 17—17 from series to series of which the power is thrown by the blades 18—18. In the case the drum 2 is locked the power passes between the blades 17—17 and 18—18 without moving them.

As the power gradually further expands in the casing 3 it is accommodated by the increasing capacity of the power chamber until it reaches the central portion of said casing which is that of largest diameter. At the center the blades 17—17 and 18—18 are omitted for a space providing with recess 9 an annular chamber from which the power is exhausted by exhaust pipe 19. It is thus evident that when drum 2 is locked, the power entering through ports 11—11 passes from the center to the ends of the drum exerting rotary motion on blades 14—14 carried by the spindle and then passes through ports 16—16 into the casing 3 and after passing through the stationary blades 17—17 and 18—18 escapes through the exhaust 19. However, if the spindle be locked and the drum free to revolve, the power entering through ports 11—11 will by contact with blades 15—15 rotate the drum and then passing out through end ports 16—16 exert additional rotary force on the exterior of the drum. In case the drum is the rotating member, the same is coupled up through the agency of its sleeve 6 with the machinery to be operated, and, vice versa, in case the spindle is the rotating member, the drum is uncoupled from the machinery and the spindle coupled up by means of its extension shaft 8. It is evident that in case blades are provided on the exterior of the drum, greater rotary force is obtainable from the drum than the spindle.

In case no blades are provided for the exterior of the drum, if desired, the outer casing may be omitted and the power exhausted directly from the drum into the open air.

The sleeve 6 and the shaft 8 inclosed therein are extended to the clutch mechanism whereby they may be attached to the machinery to be rotated such for instance as a propeller, as shown in Figs. 2 and 3. Any convenient clutch mechanism may be used but I have shown a specially devised device which I will proceed to describe. It consists of a collar 20 slidably secured to shaft 21 of the propeller 22. Said collar is held to revolve with said shaft by means of a pin 23 carried by the shaft and engaging slot 24 in said collar 20. 25 is a smaller collar rigidly secured to said shaft 21 to limit the inward travel of said collar 20. The collar 20 is provided on its outer end with an annular series of teeth 26—26.

27 is a collar rigidly secured to the protruding end of shaft 8 by key 28, which collar 27 is also provided on its outer end with an annular series of teeth 29—29 which are adapted to register and engage with the teeth 26—26 of collar 20 when said collar is advanced to the position shown in Fig. 2. When said engagement is accomplished it is evident that the propeller will rotate with the shaft 1 when the same is unlocked and power is admitted to the drum 2.

30 is a collar slidably mounted on the extremity of sleeve 6 and secured thereto to rotate therewith by means of feather 31. The outer end of collar 30 is provided with an annular series of teeth, 32—32 which register with the teeth 26—26 of collar 20 when said collars are slid to the relative positions shown in Fig. 3. It is evident that in this case the collar 20 is slid back out of engagement with collar 27 and the collar 30 is slid forward into engagement with said collar 20, it releases shaft 8 from the clutch and couples up the sleeve 6 to the propeller 22. It is thus evident that when said drum 2 revolves, it will rotate with it the propeller 22.

33 is a yoke and handle by means of which collar 30 may be shifted and 34 is a similar device by means of which collar 20 may be shifted.

The following illustrates means for locking either the drum or the spindle stationary, as desired, to permit the other member to rotate. The extremity of sleeve 6$^a$ is provided with a squared portion 35, as in Fig. 4, and the protruding end of shaft 8$^a$ is provided with a squared end 36 upon which is fitted a squared collar 37 which is equal in cross section to the squared end 35 of sleeve 8$^a$. 38 is a sliding locking block, traveling in guides, 39—39, and provided with an eye 40 of proper size to fit over the squared end 35 of sleeve 6$^a$ or the square collar 37 of shaft 8$^a$. By moving said locking block to the proper position, I may, at will, lock either the drum or the spindle, permitting the other to be rotated by the power and coupled to the propeller.

In Fig. 9 I show a modification of the mechanism shown in Fig. 1 wherein the steam or other power is led into the hollow spindle 1 and admitted to the drum 2 by means of ports 11$^a$—11$^a$ in the wall of the spindle. This is a simpler form of power admission and has that advantage.

I have described my engine or motor as duplex. However, it will be understood that it is optional whether I take my power in at the middle or one end of the drum, it being immaterial as to the location of the inlet and outlet ports.

Many variations will of course present themselves to the minds of those skilled in the art which are however well within the spirit of my invention which is not confined to the construction shown.

My motor or engine is adapted for use in connection with any power under head or pressure, such as steam, compressed air, water &c. Its adaptability to all uses is self evident but its ready reversibility and compactness make it particularly adaptable for marine uses.

What I desire to claim is:—

1. In rotary motors, the combination of a central revoluble spindle, blades mounted on said spindle, a rotatable drum inclosing said spindle, blades mounted on the interior wall of said drum opposed to said first blades, a stationary power chest surrounding the central portion of said drum and ports leading from said power chamber into the interior of said drum.

2. In rotary motors, the combination of a central rotatable spindle, blades mounted on said spindle, a rotatable drum inclosing said spindle, blades mounted on the interior wall of said drum opposed to said first blades, a casing inclosing said drum, a stationary power chest within said casing and surrounding the central portion of said drum, ports leading from said chamber into the interior of said drum and means for admitting power to said chamber.

3. In a rotary motor, the combination of a central revoluble spindle, blades mounted on said spindle, revoluble drum inclosing said spindle, blades mounted on the interior wall of said drum opposed to said first mentioned blades, a stationary power chamber surrounding the intermediate portion of said drum, and means whereby motive fluid is admitted into the interior of said drum and caused to travel between said drum and said spindle from the center toward the ends.

4. In a rotary motor, the combination of a central revoluble spindle, blades mounted on said spindle, a revoluble drum of increasing capacity from its center toward its ends surrounding said spindle, blades mounted on the interior wall of said drum opposed to said first mentioned blades, a stationary power chest adjacent to the longitudinal center of said drum, and means for admitting motive fluid from said power chamber and causing said fluid to travel from the center toward both ends between said drum and said spindle.

5. In a rotary motor, the combination of a central revoluble spindle, blades mounted on said spindle, a revoluble drum inclosing said spindle, blades mounted on both the interior and exterior walls of said drum said interior blades being of opposing pitch to the blades on said spindle, a casing inclosing said drum, blades on the interior wall of said casing opposing the blades on the outer wall of said drum, means for the admission of motive fluid into the interior of said drum adjacent to its longitudinal center, means for the escape of said fluid from the ends of said drum into said casing, and means for the escape of said fluid from said casing at a point adjacent to the longitudinal center of said casing.

6. In a rotary motor, the combination of a central revoluble spindle, blades mounted on said spindle, a revoluble drum inclosing said spindle, blades of opposing pitch to said first mentioned blades mounted on the interior wall of said drum, a casing inclosing said drum, blades on the interior wall of said casing, blades of opposing pitch to said casing blades on the exterior wall of said drum, means for the admission of motive fluid to the interior of said drum adjacent to the center thereof, means for the escape of said fluid from the ends of said drum into said casing, means for the escape of said fluid from the longitudinal center of said casing, and means for locking said drum or said spindle stationary.

7. In a rotary motor, the combination of a central revoluble spindle, blades mounted on said spindle, a rotatable drum inclosing said spindle, blades mounted on the interior wall of said drum opposing said first mentioned blades, a stationary power chest surrounding the intermediate portion of said drum, ports leading from said power chamber into the interior of said drum for the admission of motive fluid, and escape ports for said fluid at both ends of said drum.

8. In a rotary motor, the combination of inner and outer rotating members carrying blades which project within the annular space between them, and a fixed member which leaves an annular space between itself and one of the rotating members into which blades from the fixed member and from said rotating member project, a central power chest surrounding said outer member, the motive fluid having to pass from the center toward the ends in said first mentioned annular space and from the ends toward the center in said second annular space, said fluid escaping from said first annular space to said second annular space in its travel.

9. In a rotary motor, the combination of an inner rotating member from the exterior surface of which blades project and a surrounding rotating member from the interior and exterior surfaces of which blades project, a central power chest surrounding said surrounding rotating member, and a surrounding fixed casing from the inner surface of which blades project, the arrangement being adapted for the motive fluid to pass from the center toward both ends through the annular space between the inner and outer rotating members into which the blades of the inner rotating member and the inner blades of the outer rotating member project driving said inner and outer rotating members in opposite directions of rotation, and then to pass from the ends toward the center between the outer rotating member and the casing within which the exterior blades of the outer rotating member and the blades of the casing project and from thence to the outlet adjacent to the longitudinal center of the casing.

10. In a rotary motor, the combination of a central revoluble spindle, blades mounted on said spindle, a revoluble drum inclosing said spindle, blades mounted on both the interior and exterior walls of said drum, a casing of increasing capacity from its ends toward its center inclosing said drum, blades on the interior wall of said casing, means for the admission of motive fluid into the interior of said drum adjacent to its longitudinal center, means for the escape of said fluid from the ends of said drum into the ends of said casing, and means for the escape of said fluid from said casing at a point adjacent to its longitudinal center.

11. In a rotary motor, the combination of a central revoluble spindle, blades mounted on said spindle, a revoluble drum inclosing said spindle and of increasing capacity from its center toward its ends, blades mounted on both the interior and exterior walls of said drum, a casing of increasing capacity from its ends toward its center inclosing said drum, blades on the interior wall of said casing, means for the admission of motive fluid into the interior of said drum adjacent to its longitudinal center, means for the escape of said fluid from the ends of said drum into the ends of said casing, and means for the escape of said fluid from said casing at a point adjacent to its longitudinal center.

12. In a rotary motor, the combination of inner and outer rotating members carrying blades which project within the annular space between them, a fixed member which leaves an annular space of increasing capacity from its ends toward its center between it and one of said rotating members into which blades from said fixed member and said rotating member project, a central power chest surrounding the intermediate portion of said last mentioned rotating member, the motive fluid having to pass from the center toward the ends in said first mentioned annular space and from the ends toward the center in said second annular space, said fluid escaping from said first annular space into said second annular space.

13. In a rotary motor, the combination of inner and outer rotating members carrying blades which project within the annular space between them said annular space increasing in capacity from its center toward its ends, a fixed member which leaves an annular space of increasing capacity from its ends toward its center between it and one of said rotating members into which blades from said fixed member and said rotating member project, a central power chest surrounding the intermediate portion of said last mentioned rotating member, the motive fluid having to pass from the center toward the ends in said first mentioned annular space and from the ends toward the center in said second annular space, said fluid escaping from said first annular space to said second annular space.

Signed at Pittsburg, Pa. this 16th day of October 1907.

GEORGE R. RIGGS.

Witnesses:
EDWARD A. LAWRENCE,
R. B. WAKEFIELD.